US007512453B2

(12) United States Patent
Wu et al.

(10) Patent No.: US 7,512,453 B2

(45) Date of Patent: Mar. 31, 2009

(54) DATA PROCESSING SYSTEM AND METHOD SUITABLE FOR AUDIO DATA SYNTHESIS

(75) Inventors: Cheng-Ting Wu, Hsin-Chu (TW); Hung-Ming Chang, Hsin-Chu (TW); I-Hung Hsieh, Hsin-Chu (TW)

(73) Assignee: Media Tek, Inc., Hsin-Chu (TW)

( * ) Notice: Subject to any disclaimer, the term of this patent is extended or adjusted under 35 U.S.C. 154(b) by 744 days.

(21) Appl. No.: 10/852,161

(22) Filed: May 25, 2004

(65) Prior Publication Data

US 2005/0010314 A1 Jan. 13, 2005

(30) Foreign Application Priority Data

Jul. 1, 2003 (TW) ............................. 92118005 A

(51) Int. Cl.
*G10H 7/00* (2006.01)
*G06F 17/00* (2006.01)

(52) U.S. Cl. .......................................... 700/94; 84/622

(58) Field of Classification Search .................. 700/94; 84/600–604, 622, 623
See application file for complete search history.

(56) References Cited

U.S. PATENT DOCUMENTS 5,050,474 A * 9/1991 Ogawa et al. ................ 84/603
5,753,841 A 5/1998 Hewitt

* cited by examiner

*Primary Examiner*—Walter F Briney, III

(57) ABSTRACT

The present invention relates to an audio data synthesis system for sequentially processing a first predetermined number of audio data to synthesize a digital audio signal cumulatively. The system comprises a first memory, a first processor, an audio data processing unit, and a second memory. The first memory is for storing a plurality of audio data. The first processor is for generating an audio processing request for requesting to process a second predetermined number of audio data. The audio data processing unit is for receiving the audio processing request, accessing the second predetermined number of audio data stored in the first memory, and calculating every two neighboring audio data to get data processing values, and after calculating all the second predetermined number of audio data, then obtaining a third predetermined number of data processing values. The second memory is for storing the third predetermined number of audio data.

10 Claims, 10 Drawing Sheets

DATA PROCESSING SYSTEM AND METHOD SUITABLE FOR AUDIO DATA SYNTHESIS

BACKGROUND OF THE INVENTION

1. Field of the Invention

The present invention relates to a data processing system applied in an audio data synthesis system for sequentially processing a first predetermined number of audio data to cumulatively synthesize a digital audio signal in a handheld apparatus (e.g. mobile phones).

2. Description of the Prior Art

Conventional mobile phones comprise two kinds of main functions: 1. for listening, speaking, and data transmission (operated by GSM, GPRS, and CDMA systems); 2. multimedia applications (e.g. Game, MIDI, music, and digital camera). Multiple new functions have been developed with the development of mobile phones to this day. Taking GSM and GPRS as an example, one of the most popular applications is the multimedia message. The Multimedia Message Service (MMS) can send messages comprising multimedia contents, such as every kind of colored pictures, animation cartoons, and sounds (including common rings, chord rings, common sounds, and even an audio segment pre-recorded by the communication device, all depending on the support level of different communication devices). If the network transmitting speed allows, even movie clips can be transmitted. On the other hand, conventional short message service (SMS) can only transmit a few words or basic graphs.

Although MMS can make the message contents more lively and plentiful, MMS needs to use more powerful and efficient device and technology to perform; the wavetable synthesis of music signals is one of the technologies. The technology is an electronic synthesis technology that samples all kinds of instrumental sounds, digitalizes them to musical instrument data, and then stores the sounds in the synthesizing chips (or storing to disk files). Later, when synthesizing a music file, the musical instrument data that corresponds to every music file is selected and simulated; then, the musical signals corresponding to this music file are synthesized. Each musical instrument data comprises a plurality of music data, and the micro processor of the communication device co-operates with the wavetable music synthesizing system to synthesize the musical signals and re-send the musical sounds.

However, in conventional mobile phones, the micro processor already consumes most of its processing ability on listening, speaking, and data transmission. Therefore, the conventional dual micro processor system of mobile phones has been developed for the multimedia applications; the two processors are connected by a processor bridge, and the processor bridge is a dual-port memory or a register file.

The hardware managed by each micro processor is independent from each other; for example, each micro processor manages its own program memory and the data memory of the system. The program memory has the function of executing and temporarily storing a program. The data memory is used for storing system data. However, this method causes some problems: 1. wasting the hardware resource and cost of production; 2. not increasing the processing efficiency; 3. making the system more complex. This design can also be plugged with more processors in the system; however, more processors only cause the system to be more complex and increase the cost of the system substantially.

Prior arts also provide solutions for solving the problem that conventional wavetable synthesis system consumes too much processor resources in personal computers (PC). For example, U.S. Pat. No. 5,753,841 discloses an audio processing device that comprises the digital signal processor (DSP) and can be applied in a PC. The audio data are stored in the system memory of the PC, which only transmits parts of the audio data that are needed by the DSP. The DSP reads from the cache memory and processes a segment of the audio data into a segment of the digital audio signal; and when that process finishes, the DSP processes another segment of the audio data. Each segment of the processed digital audio signal is stored in the cache memory. When the digital audio signal of the whole piece of music has been stored cumulatively, the cumulated signal is transmitted from the cache memory to the external digital/analogy converter. Because the DSP of this invention directly processes the audio data via the peripheral connecting interface (PCI), without using a specific hardware to accelerate the process, a large portion of the DSP processing ability is consumed. If this invention is used on compact mobile phones with limited processing ability, the simple DSP would not be able to process large audio data calculations. Beside mobile phones, other handheld apparatus such as PDAs, palmtop PCs, or smart phones with the personal information management (PIM) function have similar problems when processing the digital audio data because the calculating ability is limited.

SUMMARY OF THE INVENTION

An objective of the invention is to provide an audio data synthesis system applied in a handheld apparatus for solving the problems of prior arts.

The system of the present invention comprises: a first memory, a first processor, an audio data processing unit, and a second memory. The first memory is used for storing a plurality of audio data. The first processor is used for generating an audio processing request to process a second predetermined number of audio data.

The audio data processing unit is used for receiving the audio processing request. According to the audio processing request, the audio data processing unit accesses the second predetermined number of audio data stored in the first memory, and it calculates every two neighboring audio data of the second predetermined number of audio data by a data processing formulae, so as to get a data processing value. After the audio data processing unit calculates all the second predetermined number of audio data, then a third predetermined number of data processing values is obtained. The second memory is used for temporarily storing the third predetermined number of audio data. Wherein, when the audio data processing unit has finished processing the second predetermined number of audio data, the first processor continuously generates follow-up audio processing requests until all the first predetermined number of audio data has been processed; the first processor then synthesizes the data processing values, which correspond to the first predetermined number of audio data that is temporarily stored in the second memory, into a digital audio signal, and then outputs the signal.

The audio data synthesis system of the present invention uses the audio data processing unit to calculate every two neighboring audio data by a data processing formulae for obtaining a data processing value, so as to increase the sampling points of the audio data. Therefore, the envelope on playing becomes more complete, and more perfect music can be played. By the improvement of the system construction and accessing method, and by appending the data access module, the loading of the system processor can be decreased effectively. Therefore, the system processor can process more work at the same time.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
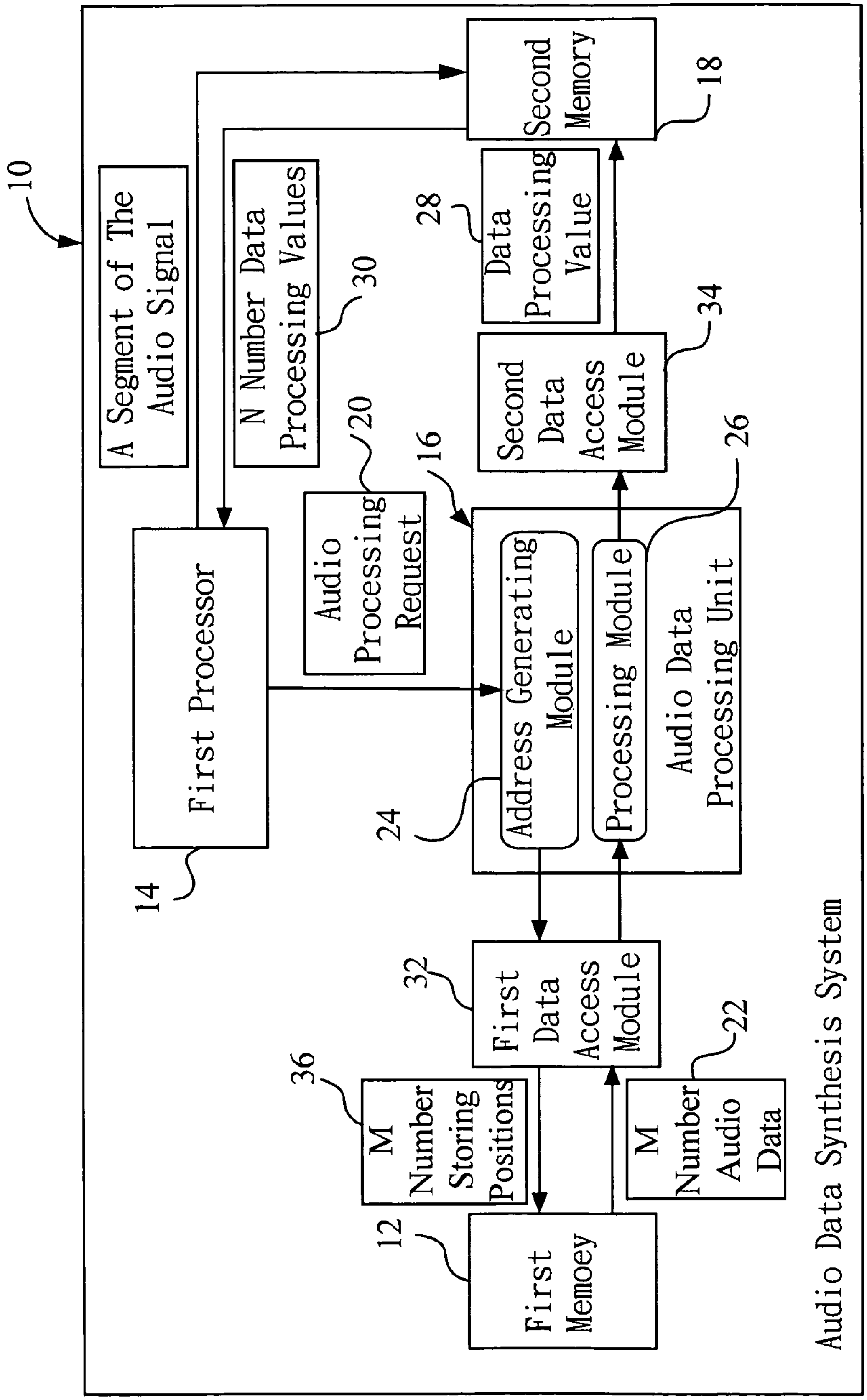
FIG. 1 is a schematic diagram of the audio data synthesis system of the 1st preferred embodiment according to the present invention.

Referring to FIG. 1, FIG. 1 is a schematic diagram of the audio data synthesis system 10 of the 1st preferred embodiment according to the present invention. The audio data synthesis system 10 is applied in a handheld apparatus for sequentially processing a predetermined number (L) of audio data to synthesize a digital audio signal cumulatively. The audio data synthesis system 10 comprises a first memory 12, a first processor 14, an audio data processing unit 16, and a second memory 18.

The first memory 12 comprises a plurality of storing positions for storing a plurality of audio data. For example, the first memory 12 records 128 kinds of string musical instrument data and 47 kinds of percussion musical instrument data; each of the 175 kinds of musical instrument data is analyzed and stored as a plurality of audio data. The first processor 14 is used for generating an audio processing request 20. The audio processing request 20 is used for requesting to process a predetermined number (M) of audio data 22.

The audio data processing unit 16 comprises an address generating module 24 and a processing module 26. The address generating module 24 is used for receiving the audio processing request 20, and according to the audio processing request 20, the module 24 assigns a M number of storing positions 36 in the first memory 12 to the M number of audio data 22. The processing module 26 is used for accessing the M number of audio data 22 stored in the first memory 12, and according to a data processing formulae, the module 26 calculates every two neighboring audio data of the M number of audio data to get the data processing values 28 and further obtains a predetermined number (N) of data processing values 30.

The second memory 18 is used for temporarily storing the N number of data processing values 30 after the audio data processing unit 16 has finished processing the M number of audio data 22 according to the audio processing request 20 from the first processor 14. The first processor 14 accesses the N number of data processing values 30 from the second memory 18 and synthesizes those into a segment of an audio signal, which is then re-stored in the second memory 18. The segment of the audio signal can be an audio segment of the digital audio signal or a musical note of the audio segment. While the first processor 14 is synthesizing the N number of data processing values 30, the next audio processing request is being sent to continue requesting the audio data processing unit 16 to process the audio data, until all the L number of audio data has been processed. Moreover, after the second memory 18 temporarily stores the audio signals corresponding to the L number of audio data, the first processor 14 synthesizes all the audio signals into a digital audio signal corresponding to the L number of audio data, and then it transmits the digital audio signal to the later circuits for processing.

As shown in FIG. 1, the audio data processing unit 16 accesses data in the first memory 12 via a first data access module 32 and accesses data in the second memory 18 via a second data access module 34.

In the preferred embodiment, the data processing formulae is:

$$D=P(X)\times\alpha+P(Y)\times(1-\alpha)$$

wherein Y=X+1.

D is the data processing value 28; α is the pitch adjusting coefficient; P(X) is the former audio data of the two neighboring audio data, and P(Y) is the later audio data of the two neighboring audio data, wherein X and Y represent the storing positions corresponding to the two neighboring audio data.

According to the audio processing request, the address generating module 24 of the present invention predetermines a data processing initial value and a pitch adjusting rate for calculating α and X. α is the decimal part after the data processing initial value adds to the value of an integer multiple of the pitch adjusting rate, and X is the integer part. For example, if the data processing initial value is 1.2, and the pitch adjusting rate is 0.7, after the data processing initial value adds to the value of an integer multiple of the pitch adjusting rate, a cumulative array {1.9,2.6,3.3,4.0,4.7 . . . } is obtained. Therefore, α is the element of the array {0.9,0.6, 0.3,0.0,0.7, . . . }, and X is the element of the array {1,2,3,4, 4, . . . }, corresponding to. α. The address generating module 24 calculates X and α according to the above method and then calculates Y. The processing module 26 then accesses the two neighboring audio data (P(X) and P(Y)), corresponding to X and Y, from the first memory 12, and it substitutes α, P(X), and P(Y), which are calculated by the address generating module 24, into the data processing formulae, so as to obtain the data processing values 28.

Figure 2:
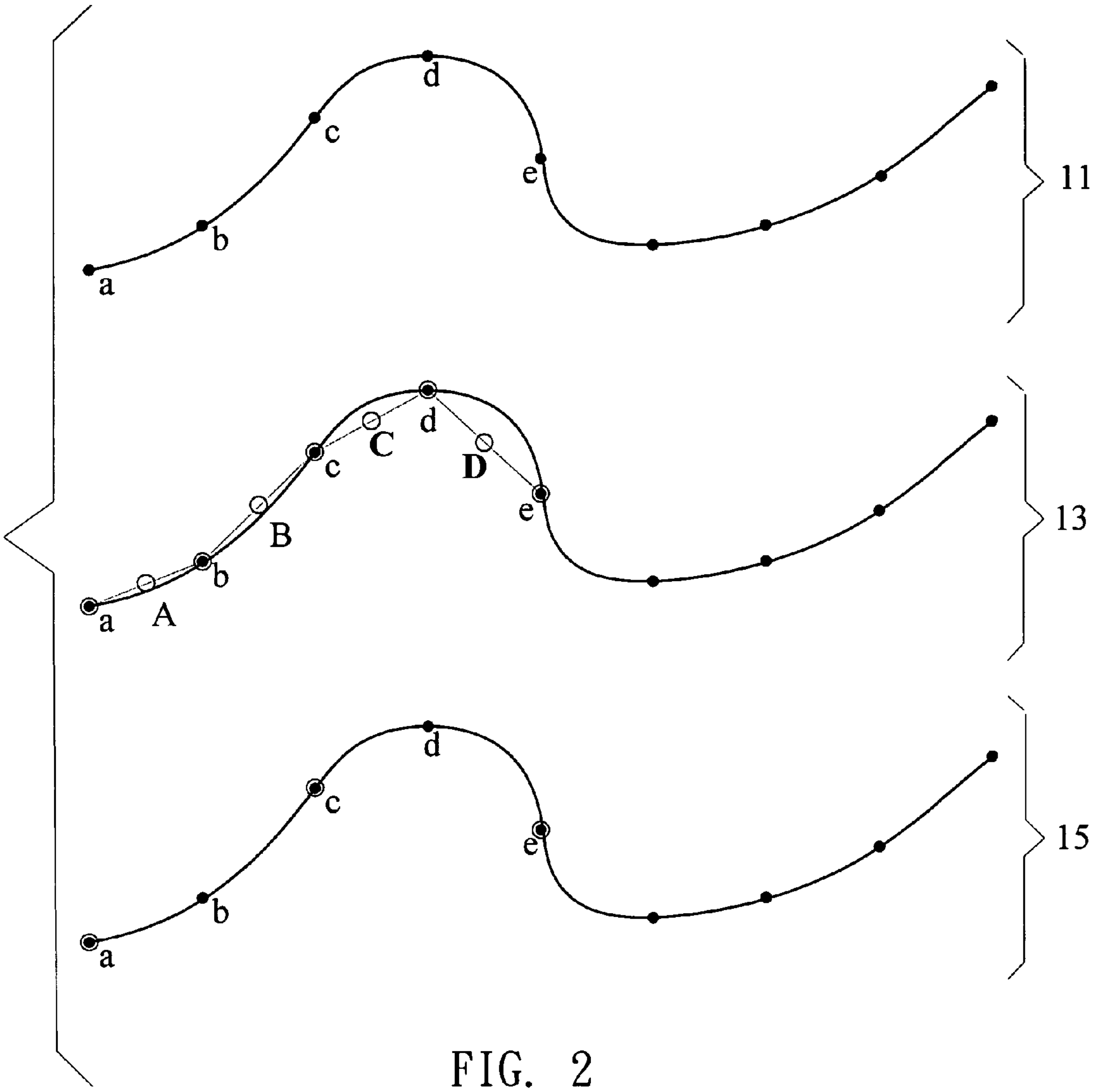
FIG. 2 is a schematic diagram of the M number of audio data and the corresponding audio data processing values shown in FIG. 1.

Referring to FIG. 2, FIG. 2 is a schematic diagram of the M number of audio data 22 and the corresponding audio data processing values 28 shown in FIG. 1. The data processing of the present invention is embodied in the concept of the interpolation: by reading the two neighboring audio data and performing the data processing calculation on the data, the data processing values 28 are obtained. FIG. 2 comprises graph 11, graph 13, and graph 15. Graph 11 represents the original audio data stored during the time interval f, wherein the elements (a, b, c . . . ) represent the original audio data. Graph 13 represents the data processing values 28, which are calculated by applying the data processing formulae when $\alpha=0.5$, wherein the time interval is shortened to be f/2 after the calculation; the elements (A, B, C . . . ) represent the calculated data processing values 28. Graph 15 represents the data processing values 28, which are calculated by applying the data processing formulae when $\alpha=2$, wherein the time interval is extended to be 2 f after the calculation; the elements (a, c, e . . . ) represent the calculated data processing values 28.

Figure 3:
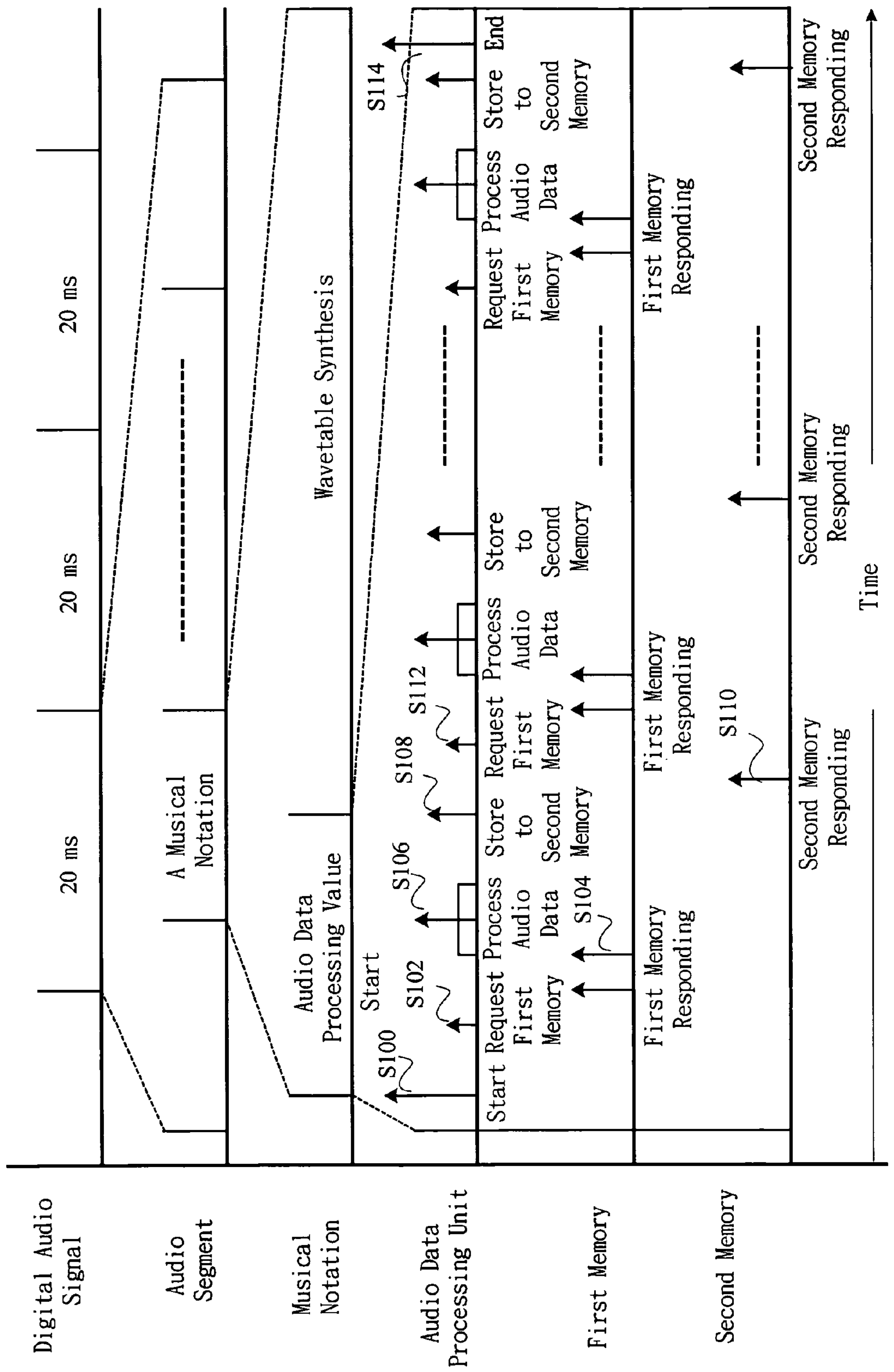
FIG. 3 is a time sequence diagram when processing the audio data according to the present invention.

Referring to FIG. 3, FIG. 3 is a time sequence diagram for processing the audio data according to the present invention. When the processor of a handheld apparatus processes the digital audio signal, the digital audio signal is subdivided into a plurality of audio segments (e.g. a segment with 20 micro seconds); each audio segment comprises a plurality of musical notes. The processing for each musical note comprises two parts: the data processing value 28 and the wavetable synthesis. The generating procedure for the data processing value 28 involves the three main units shown in FIG. 1: the audio data processing unit 16, the first memory 12, and the second memory 18. As shown in FIG. 3, the generating procedure comprises the following steps:

Step S100: the audio data processing unit 16 receives the audio processing request 20 from the first processor 14.

Step S102: the audio data processing unit 16 sends the storing positions of two neighboring audio data, which are necessary when calculating the data processing value 28, to the first memory 12.

Step S104: the first memory 12 transmits the needed two neighboring audio data to the audio data processing unit 16.

Step S106: the audio data processing unit 16 processes the two neighboring audio data, and generates the data processing value 28.

Step S108: the audio data processing unit 16 stores the data processing value 28 into the second memory 18.

Step S110: the second memory 18 responses that the step S108 has been finished.

Step S112: the audio data processing unit 16 processes the next data processing value 28.

Step S114: when the number of the data processing values 28 reaches a predetermined number, the audio data processing unit 16 sends an ending signal.

Next, the request of the first processor 14 for processing two audio data every time is used to further describe the present invention. As shown in FIG. 1, first, the first processor sends out the audio processing request 20 for processing the two predetermined audio data. The audio processing request 20 comprises a data processing initial value and a pitch adjusting rate. After the address generating module 24 of the audio data processing unit 16 receives the audio processing request 20, according to the data processing initial value of the audio processing request 20, the address generating module 24 assigns the storing positions in the first memory to the first audio data and the following second audio data. The processing module 26 accesses two audio data 22 stored in the first memory 12, calculates the two audio data 22 by the data processing formulae to obtain the data processing values 28, and temporarily stores the data processing values 28 in the second memory. Then, the first processor 14 sends out the next audio processing request for requesting the audio data processing unit 16 to process the audio data continuously.

Figure 4:
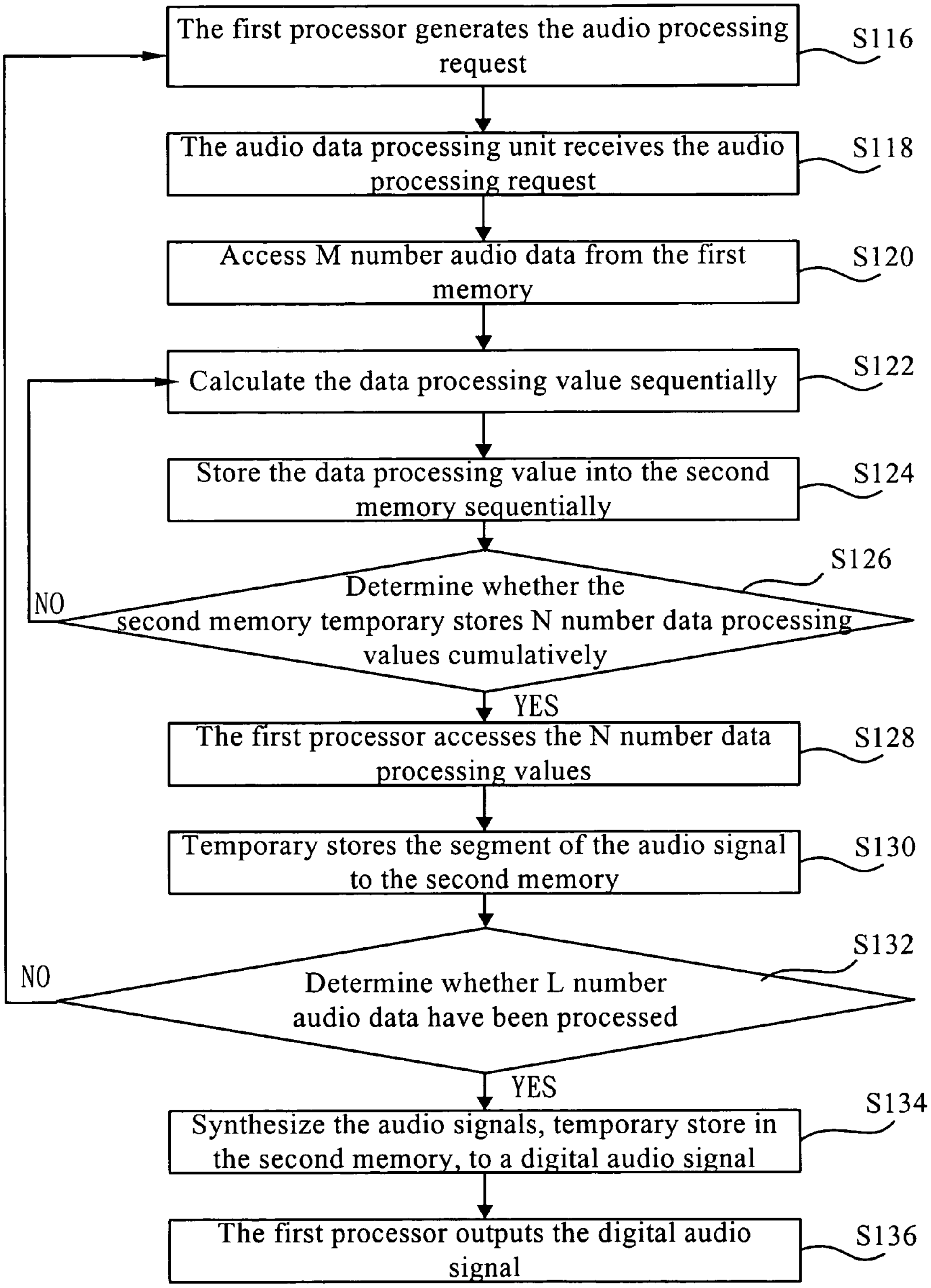
FIG. 4 is a flow chart of the audio data synthesis method according to the present invention.

Referring to FIG. 4, FIG. 4 is a flow chart of the audio data synthesis method according to the present invention. According to the above descriptions, the audio data synthesis method comprises the following steps:

Step S116: the first processor 14 generates the audio processing request 20.

Step S118: the audio data processing unit 16 receives the audio processing request 20.

Step S120: the audio data processing unit 16 accesses M number of audio data 22 from the first memory 14.

Step S122: according to every two neighboring audio data of the M number of audio data 22, the audio data processing unit 16 calculates the data processing values 28 sequentially.

Step S124: the audio data processing unit 16 stores the data processing values 28 in the second memory 18 sequentially.

Step S126: the audio data processing unit 16 determines whether the second memory 18 already temporarily stores N number of data processing values 30 cumulatively; if YES, go to step S128; if NO, go to step S122.

Step S128: the first processor 14 accesses N number of data processing values 30 and synthesizes those into the segment of audio signal.

Step S130: the first processor 14 temporarily stores the segment of the audio signal to the second memory 18.

Step S132: the audio data processing unit 16 determines whether L number of audio data have been processed; if YES, go to step S134; if NO, go to step S116.

Step S134: the audio data processing unit 16 synthesizes the audio signals temporarily stored in the second memory 18 into a digital audio signal.

Step S136: the first processor 14 outputs the digital audio signal.

Figure 5:
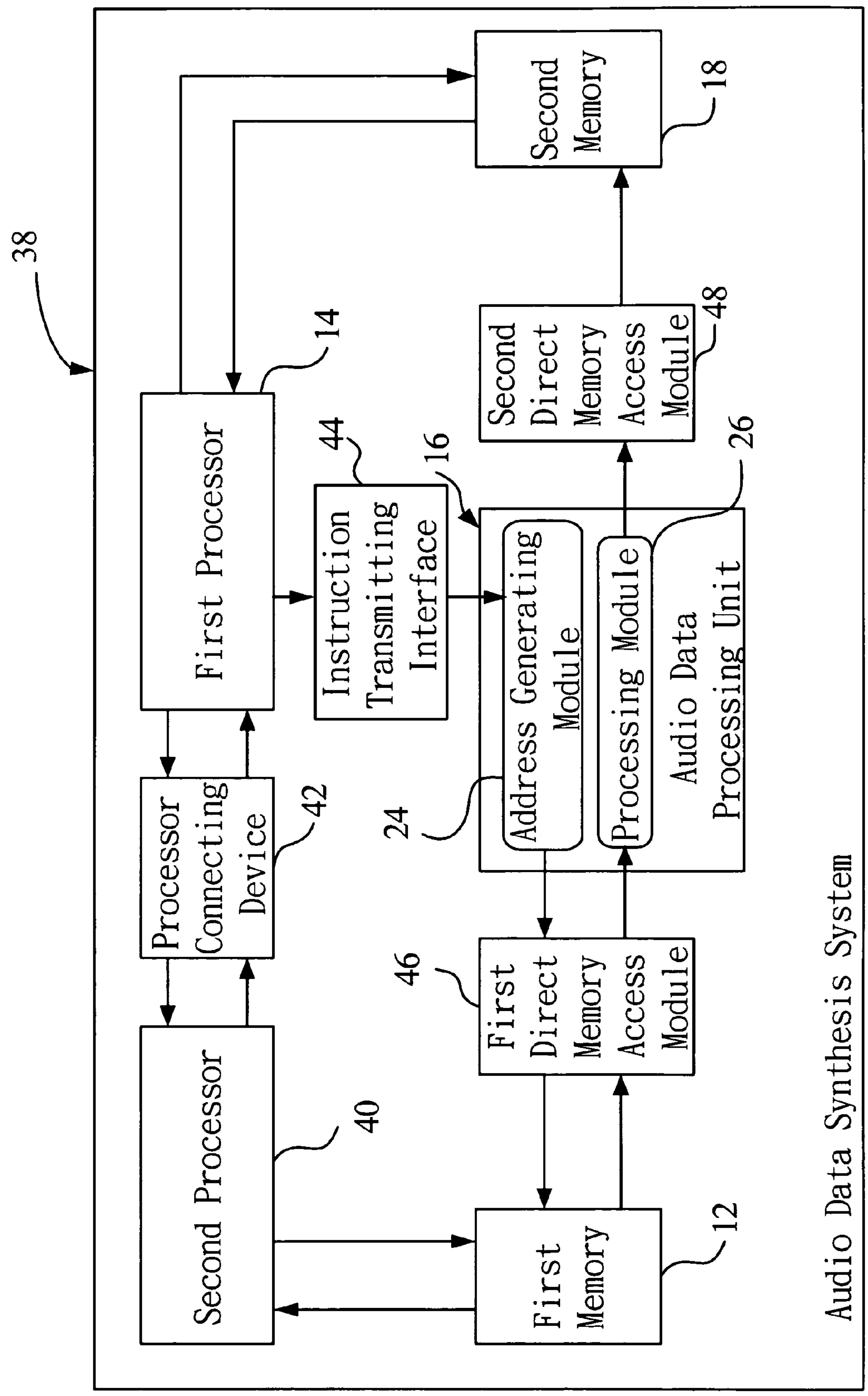
FIG. 5 is a schematic diagram of the audio data synthesis system of the 2nd preferred embodiment according to the present invention.

Referring to FIG. 5, FIG. 5 is a schematic diagram of the audio data synthesis system 38 of the 2nd preferred embodiment according to the present invention. The present invention can be applied in a single processor or a plurality of processors. The 2nd preferred embodiment is taking the dual processors as an example. Beside the items shown in FIG. 1, the 2nd preferred embodiment further comprises a second processor 40, a processor connecting device 42, an instruction transmitting interface 44, a first direct memory access module 46, and a second direct memory access module 48.

The processor connecting device 42 is used as the communication interface between the first processor 14 and the second processor 40. The instruction transmitting interface 44 is used as the interface when the first processor 14 outputs instructions to the audio data processing unit 16. The first direct memory access module 46 of this preferred embodiment is equal to the first data access module 32 shown in FIG. 1; the first direct memory access module 46 is used as the interface when the audio data processing unit 16 accesses the first memory 12. The second direct memory access module 48 of this preferred embodiment is equal to the second data access module 34 shown in FIG. 1; the second direct memory access module 48 is used as the interface when the audio data processing unit 16 accesses the second memory 18. Wherein the first processor 14 is the digital signal processor of a handheld apparatus processor, the second processor 40 is the microprocessor. The 2nd preferred embodiment can reduce the processing load of a handheld apparatus processor by directly accessing the memory via the direct memory access module.

Figure 6:
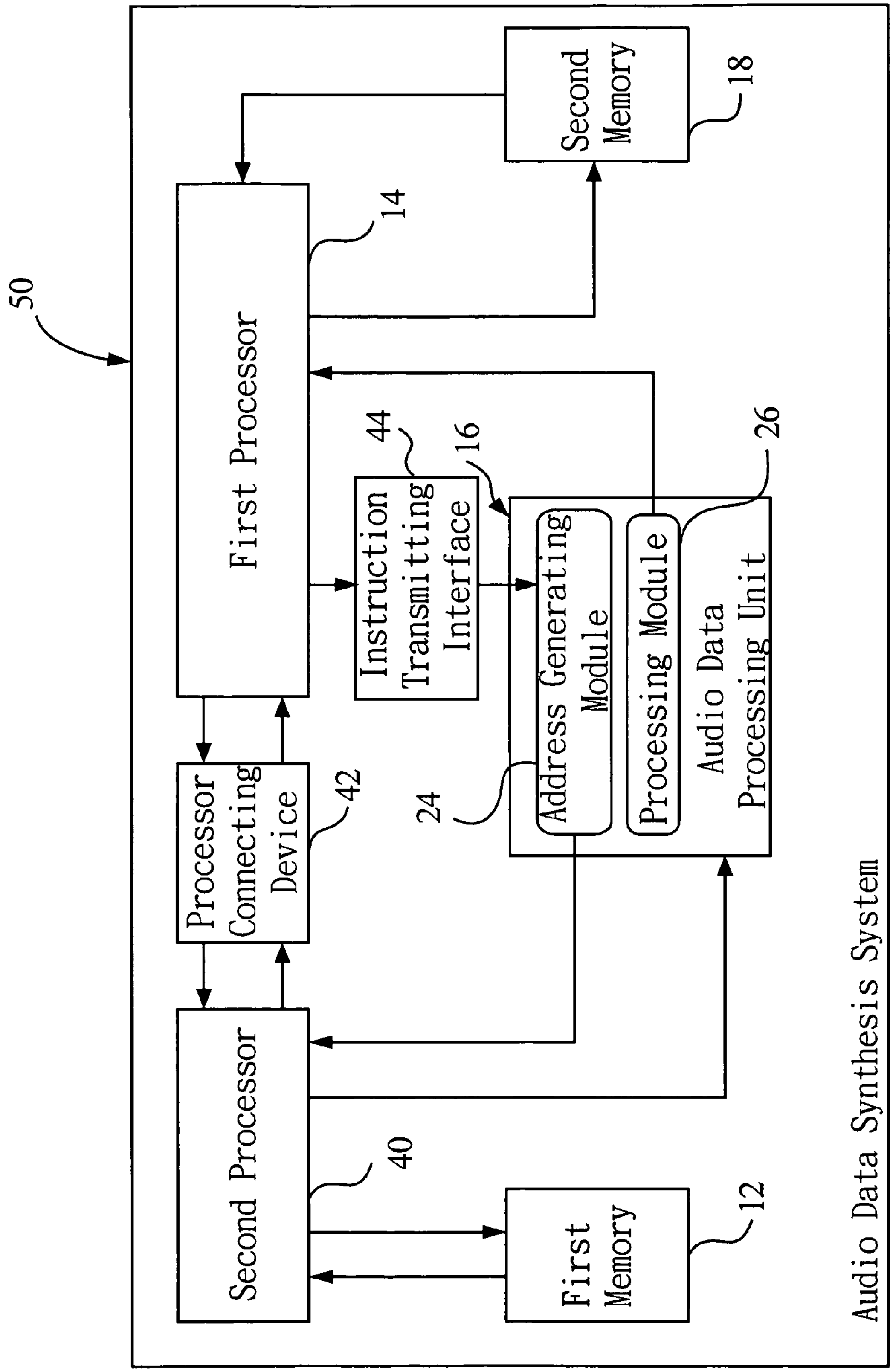
FIG. 6 is a schematic diagram of the audio data synthesis system of the 3rd preferred embodiment according to the present invention.

Referring to FIG. 6, FIG. 6 is a schematic diagram of the audio data synthesis system 50 of the 3rd preferred embodiment according to the present invention. In the 3rd preferred embodiment, the first data access module 32 is merged to the second processor 40, and the second processor 40 changes to be the interface when the audio data processing unit 16 accesses the first memory 12. The second data access module 34 is integrated into the first processor 14. The audio data processing unit 16 accesses data in the second memory 18 via the first processor 14.

Figure 7:
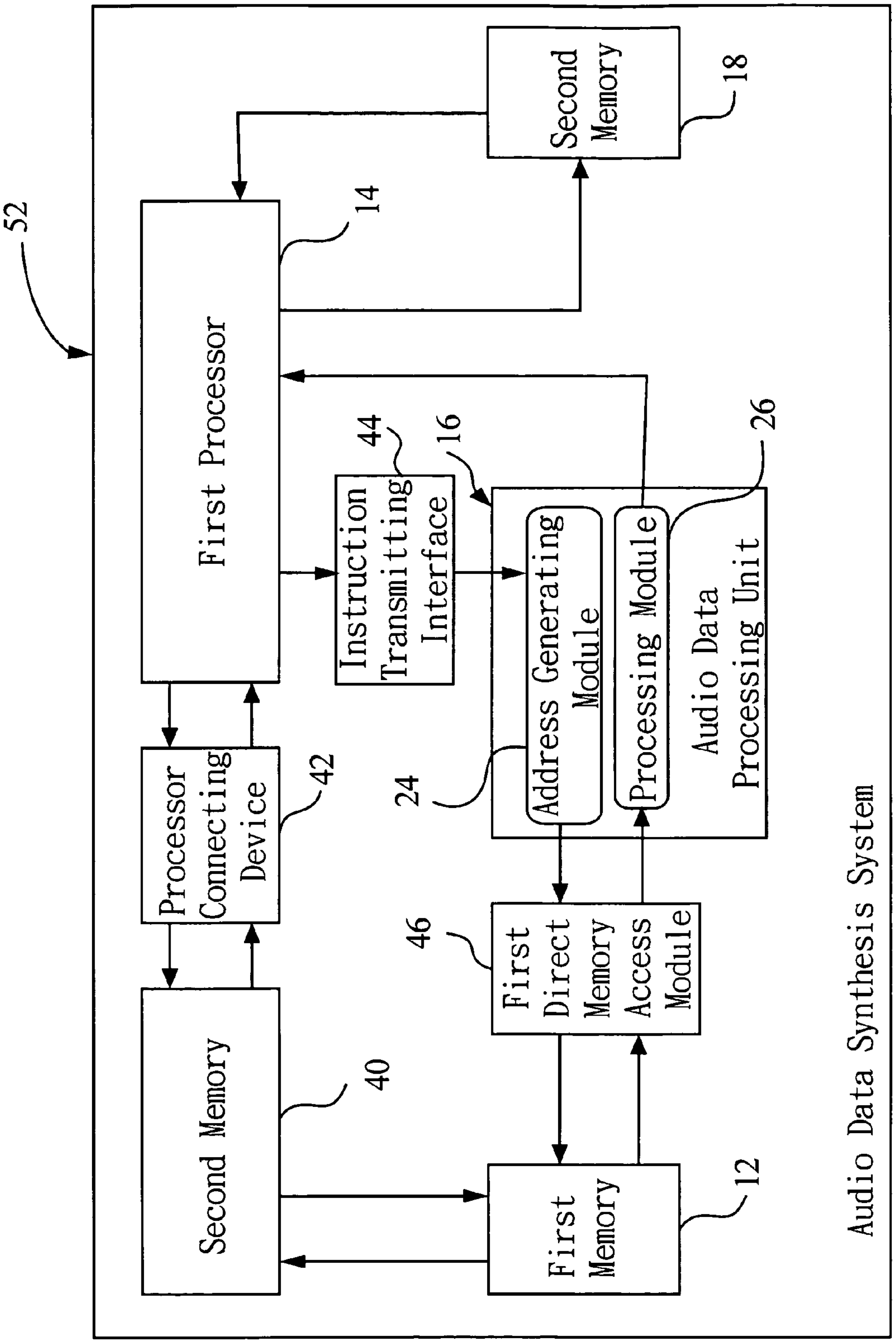
FIG. 7 is a schematic diagram of the audio data synthesis system of the 4th preferred embodiment according to the present invention.

Referring to FIG. 7, FIG. 7 is a schematic diagram of the audio data synthesis system 52 of the 4th preferred embodiment according to the present invention. In the 4th preferred embodiment, the audio data processing unit 16 accesses data in the first memory 12 via the first direct memory access module 46 and accesses data in the second memory 18 via the first processor 14.

Figure 8:
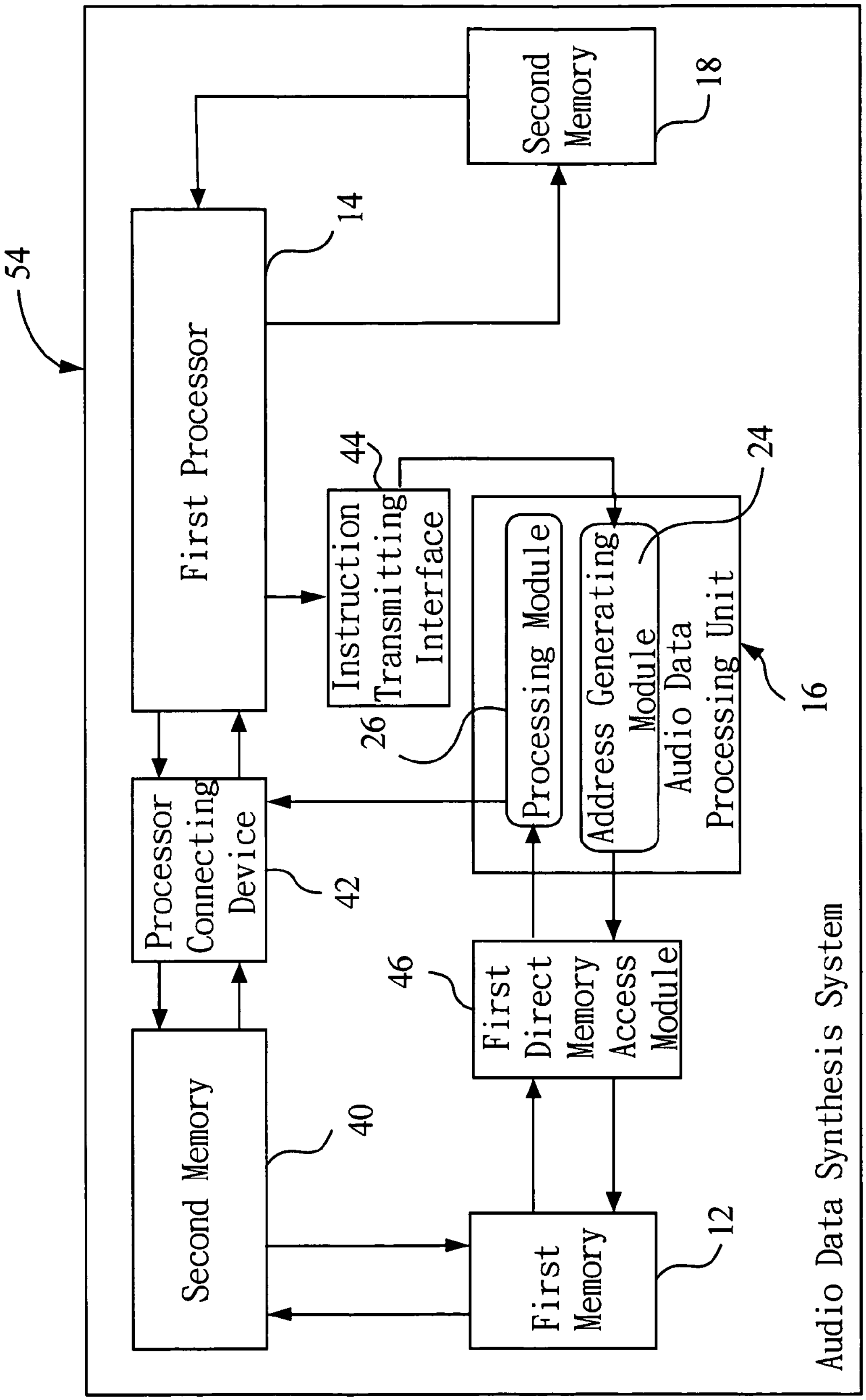
FIG. 8 is a schematic diagram of the audio data synthesis system of the 5th preferred embodiment according to the present invention.

Referring to FIG. 8, FIG. 8 is a schematic diagram of the audio data synthesis system 54 of the 5th preferred embodiment according to the present invention. In the 5th preferred embodiment, the audio data processing unit 16 accesses data in the first memory 12 via the first direct memory access module 46 and accesses data in the second memory 18 via the processor connecting device 42 by the first processor 14.

Figure 9:
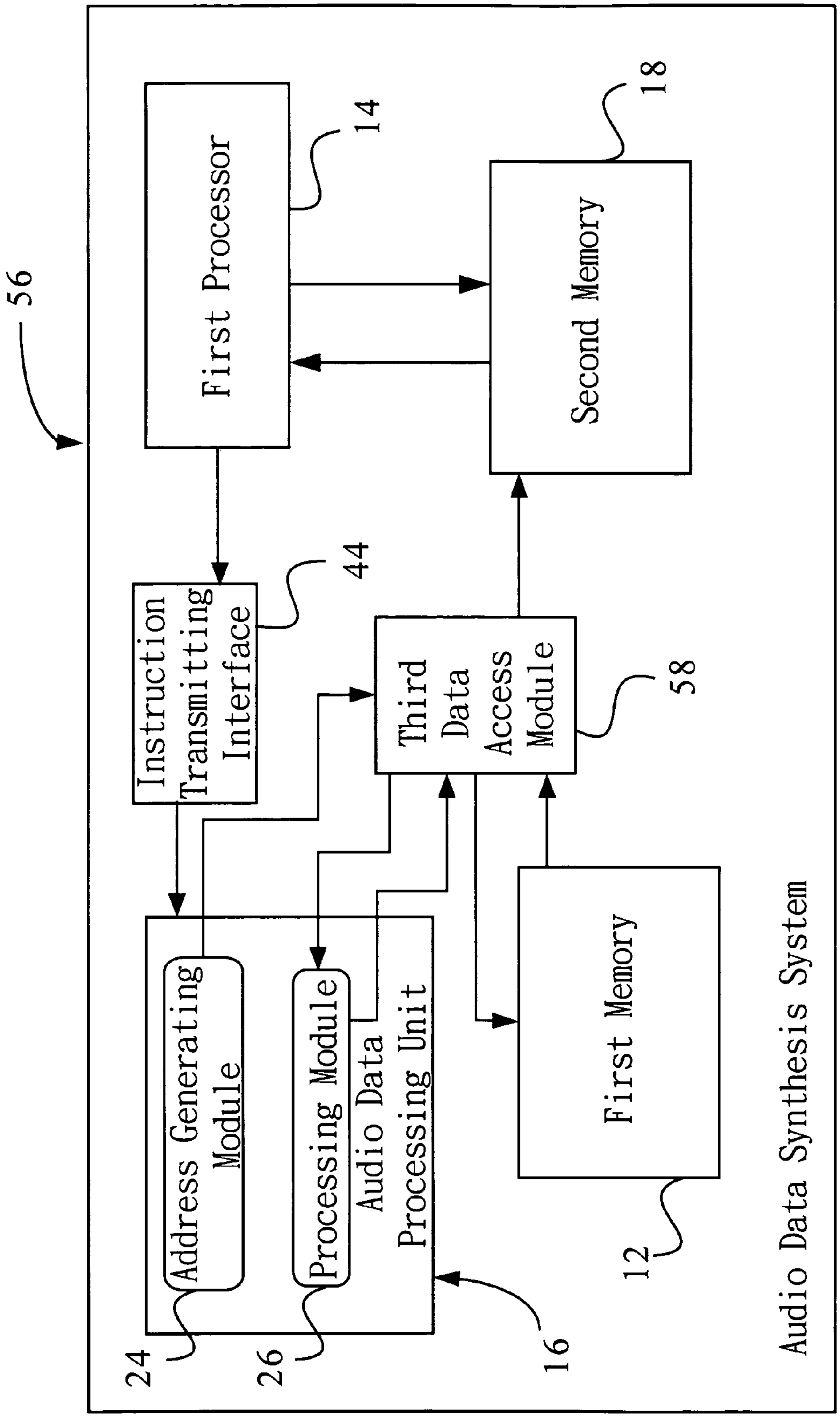
FIG. 9 is a schematic diagram of the audio data synthesis system of the 6th preferred embodiment according to the present invention.

Referring to FIG. 9, FIG. 9 is a schematic diagram of the audio data synthesis system 56 of the 6th preferred embodiment according to the present invention. The 6th preferred embodiment comprises a third data access module 58; the audio data processing unit 16 accesses data in the first memory 12 and the second memory 18 via the third data access module 58.

By the operations of the above preferred embodiments, the objective of the present invention can be reached. However, because the number of units is different, the cost of each system is also different.

Besides, because each audio data of the present invention is pre-recorded, during recording, parts of the audio data can be re-used under the consideration of keeping the audio quality and saving memory space; it is not necessary to record all the audio data in each instrumental data. Therefore, the wavetable synthesis system pre-determines a loop turning point and a loop initial point for re-using the audio data. By this way, when reading the repeated data, the present invention forms a loop, so as to save the unnecessary storing positions.

Figure 10:
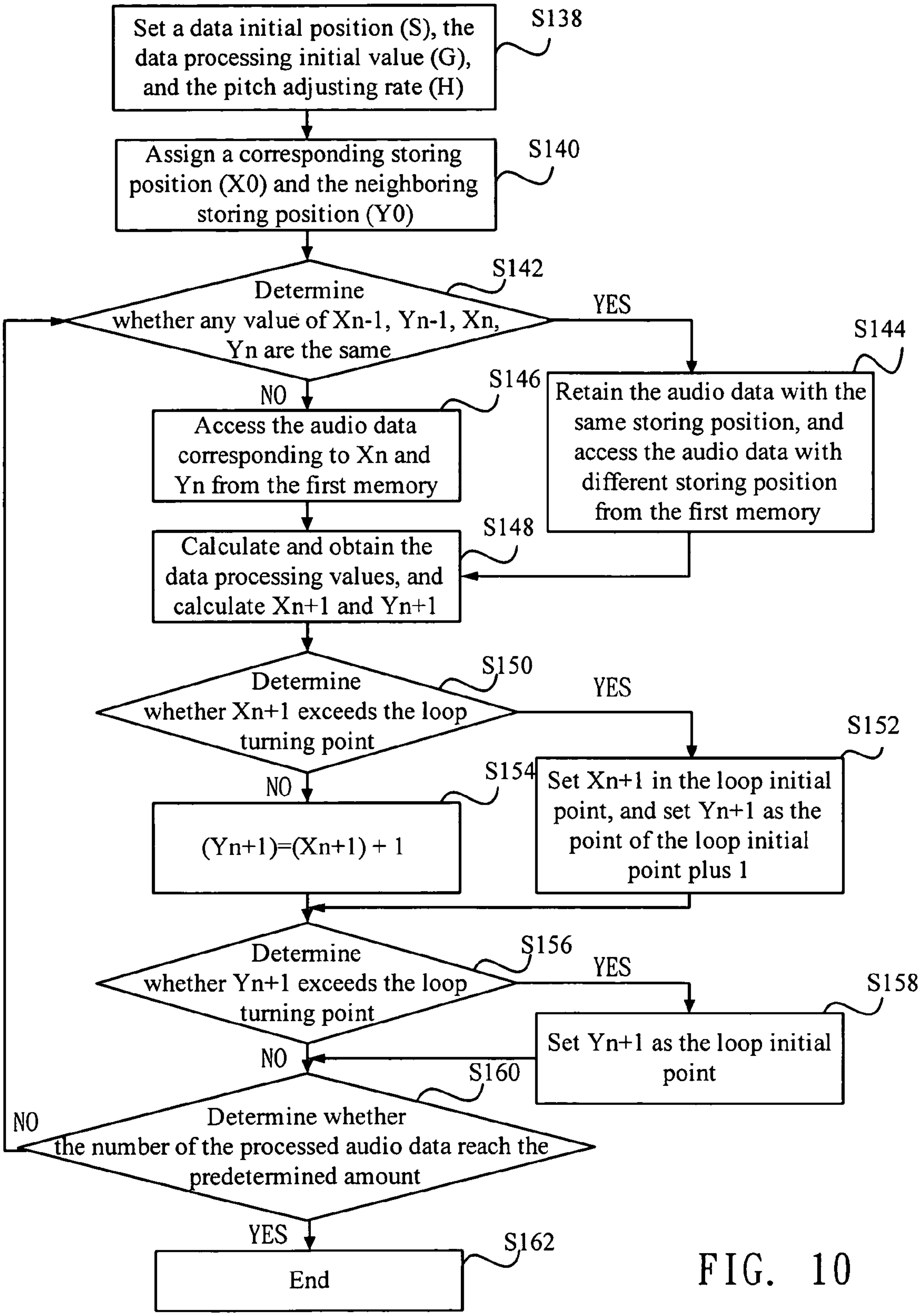
FIG. 10 is a flow chart of the audio data synthesis method applied to the audio data loop according to the present invention.

Referring to FIG. 10, FIG. 10 is a flow chart of the audio data synthesis method applying the audio data loop according to the present invention. The steps comprise:

Step S138: set a data initial position (S), the data processing initial value (G), and the pitch adjusting rate (H).

Step S140: according to the integer part of G, assign a corresponding storing position (X0) and the neighboring storing position (Y0).

Step S142: determine whether any value in the storing positions (Xn−1 and Yn−1) of the pervious two neighboring audio data is the same with the value in the storing positions (Xn and Yn) of the present two neighboring audio data; if YES, then go to step S144; if NO, then go to step S146.

Step S144: retain the audio data with the same storing position and access the audio data with different storing position from the first memory 12, then go to step S148.

Step S146: access the audio data corresponding to Xn and Yn from the first memory 12.

Step S148: use the data processing formulae for calculation so as to obtain the data processing values 28, and calculate the storing positions (Xn+1 and Yn+1) of the next two neighboring audio data.

Step S150: determine whether Xn+1 exceeds the loop turning point, if YES, then go to step S152; if NO, then go to step S154.

Step S152: set Xn+1 in the loop initial point, and set the neighboring storing position (Yn+1) as the point of the loop initial point plus 1.

Step S154: set Yn+1 as Xn+1 plus 1.

Step S156: determine whether Yn+1 exceeds the loop turning point; if YES, then go to step S158; if NO, then go to Step S160.

Step S158: set Yn+1 as the loop initial point.

Step S160: determine whether the number of the processed audio data reaches the predetermined number, if YES, then go to step S162; if NO, then go to step S142.

Step S162: end, and wait for the next request.

With the method mentioned above, the present invention can directly access the audio data corresponding to Xn and Yn in the first memory 12 for further processing, without comparing the storing positions (Xn and Yn) of the present two neighboring audio data with the storing positions (Xn−1 and Yn−1) of the previous two neighboring audio data. Therefore, the steps S142 and S144 shown in FIG. 10 can be omitted, and in step S160, if the determination is NO, then it can proceed to the step S146.

According to the above descriptions, the audio data synthesis system of the present invention uses the audio data processing unit 16 to calculate every two neighboring audio data by a data processing formulae for obtaining a data processing value 28, so as to increase the sampling points of the audio data. Therefore, the envelope on playing becomes more complete, and the music being played can be more perfect. Moreover, by the improvement of the systemic structure and accessing method, and by adding the direct memory access module, the load of the system processor can be decreased effectively. The memory under the construction of the present invention can be used and shared among the system processors, so the present invention saves the hardware resources of the system efficiently and increases the usage efficiency.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An audio data synthesis system for sequentially processing a first predetermined number of audio data to synthesize a digital audio signal cumulatively, the system comprising:

a first memory for storing a plurality of audio data;

a first processor for generating an audio processing request for requesting to process a second predetermined number of audio data;

an audio data processing unit for receiving the audio processing request;

accessing the second predetermined number of audio data stored in the first memory; and according to a data processing formulae, calculating every two neighboring audio data of the second predetermined number of audio data to get a data processing value, and after calculating all the second predetermined number of audio data, then obtaining a third predetermined number of data processing values;

a second memory for storing the third predetermined number of audio data;

wherein when the audio data processing unit has finished processing the second predetermined number of audio data, the first processor continuously generates follow-up audio processing requests, until all the first predetermined number of audio data have been processed, then the first processor synthesizes the data processing values corresponding to the first predetermined number of audio data which is temporarily stored in the second memory, into a digital audio signal, and then outputs the signal.

2. The audio data synthesis system of claim 1, wherein the first memory comprises a plurality of storing positions; the audio data processing unit comprises:

an address generating module for receiving the audio processing request; and according to the audio processing request, assigning a second predetermined number of storing positions in the first memory where the second predetermined number of audio data are stored;

a processing module for accessing the second predetermined number of audio data stored in the first memory; and according to a data processing formulae, calculating every two neighboring audio data of the second predetermined number of audio data to get the data processing values.

3. The audio data synthesis system of claim 1, further comprising a first data access module, the audio data processing unit accessing the data in the first memory via the first data access module.

4. The audio data synthesis system of claim 3, wherein the first data access module is a first direct memory access module for being the interface when the audio data processing unit accesses the first memory.

5. The audio data synthesis system of claim 3, wherein the first data access module is a second processor for being the interface when the audio data processing unit accesses the first memory.

6. The audio data synthesis system of claim 1, further comprising a second data access module, the audio data processing unit accessing data in the second memory via the second data access module.

7. The audio data synthesis system of claim 6, wherein the second data access module is a second direct memory access module for being the interface when the audio data processing unit accesses the second memory.

8. The audio data synthesis system of claim 6, wherein the second data access module is integrated into the first processor.

9. The audio data synthesis system of claim 1, further comprising a third data access module, the audio data processing unit accessing the data in the first and second memories via the third data access module.

10. The audio data synthesis system of claim 1, wherein the data processing formulae is shown as follow:

$$P(X)\times\alpha+P(Y)\times(1-\alpha)$$

wherein P(X) represents the former audio data of two neighboring audio data, P(Y) represents the later audio data of two neighboring audio data, X represents the storing position of the former audio data, Y represents the storing position of the later audio data, and $\alpha$ is a factor.

* * * * *